(12) United States Patent
Nagano et al.

(10) Patent No.: US 7,958,779 B2
(45) Date of Patent: Jun. 14, 2011

(54) ANGULAR VELOCITY/ANGULAR ACCELERATION CALCULATOR, TORQUE ESTIMATOR, AND COMBUSTION STATE ESTIMATOR

(75) Inventors: Takafumi Nagano, Tokyo (JP); Takashi Iwamoto, Tokyo (JP); Tomoko Tanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 134 days.

(21) Appl. No.: 12/434,255

(22) Filed: May 1, 2009

(65) Prior Publication Data

US 2009/0282903 A1    Nov. 19, 2009

(30) Foreign Application Priority Data

May 15, 2008 (JP) ................................. 2008-128132

(51) Int. Cl.
*G01M 15/04* (2006.01)
(52) U.S. Cl. ................ 73/114.25; 73/114.15; 73/114.24
(58) Field of Classification Search ............... 73/114.15, 73/114.24, 114.25
See application file for complete search history.

(56) References Cited

U.S. PATENT DOCUMENTS

| | | | | |
|---|---|---|---|---|
| 5,487,008 A | * | 1/1996 | Ribbens et al. | 701/102 |
| 5,495,415 A | * | 2/1996 | Ribbens et al. | 701/111 |
| 6,021,758 A | * | 2/2000 | Carey et al. | 123/436 |
| 6,651,490 B1 | * | 11/2003 | Ceccarani et al. | 73/114.74 |
| 6,873,930 B2 | * | 3/2005 | Hirn | 702/142 |
| 7,530,261 B2 | * | 5/2009 | Walters | 73/114.04 |

FOREIGN PATENT DOCUMENTS

JP    2005-61371    3/2005

* cited by examiner

*Primary Examiner* — Freddie Kirkland, III
(74) *Attorney, Agent, or Firm* — Oblon, Spivak, McClelland, Maier & Neustadt, L.L.P.

(57) ABSTRACT

An angular velocity/angular acceleration calculator of the crankshaft in an internal combustion engine includes a crank angle detection device, a crank angle correction device, and an angular velocity/angular acceleration calculation device. The crank angle detection device detects a crank angle in the internal combustion engine and a time at the crank angle. The crank angle correction device corrects the crank angle and the time thus detected to an equiangular crank angle and a time corresponding thereto. The angular velocity/angular acceleration calculation device calculates an angular velocity and an angular acceleration of the crankshaft by converting a function of the time with respect to the crank angle that are corrected by the crank angle correction device so as to be regarded as a periodic function, and utilizing the discrete Fourier transform of the converted function.

9 Claims, 6 Drawing Sheets

ANGULAR VELOCITY/ANGULAR ACCELERATION CALCULATOR, TORQUE ESTIMATOR, AND COMBUSTION STATE ESTIMATOR

BACKGROUND OF THE INVENTION

1. Field of the Invention

The present invention relates to angular velocity/angular acceleration calculators, torque estimators, and combustion state estimators, and particularly relates to an angular velocity/angular acceleration calculator, a torque estimator, and a combustion state estimator for an internal combustion engine.

2. Description of the Background Art

Highly accurate control of an internal combustion engine is effectively realized by measuring a combustion state of the engine and controlling the engine with a measurement result thereof being fed back. For such highly accurate control, it is important to precisely measure the combustion state of the engine. The combustion state of the engine can be measured by measuring an internal pressure of a cylinder with a cylinder internal pressure sensor to calculate a torque, or by estimating a gas pressure torque according to a crank angle sensor signal.

Japanese Patent Application Laid-Open No. 2005-61371 discloses a method for estimating a gas pressure torque according to a crank angle sensor signal. In Japanese Patent Application Laid-Open No. 2005-61371, an average angular acceleration of a crankshaft in a predetermined crank angle range is obtained according to a crank angle measured with a crank angle sensor, and an average value of gas pressure torques is estimated according to the average angular acceleration, a previously obtained moment of inertia around the crankshaft, and a previously stored friction torque.

However, problems on durability and cost arise in such a method of measuring an internal pressure of a cylinder with a cylinder internal pressure sensor and calculating a torque. In the method disclosed in Japanese Patent Application Laid-Open No. 2005-61371, what is calculated is not an angular acceleration of the crankshaft but the average angular acceleration in the predetermined crank angle range. Thus, only estimated is an average value of gas pressure torques. Further, the method of Japanese Patent Application Laid-Open No. 2005-61371 is merely for obtaining an angular velocity according to a crank angle by difference approximation and calculating the average angular acceleration according to a difference in angular velocity between two predetermined crank angles. Therefore, this method is not for calculating an angular acceleration.

In the method disclosed in Japanese Patent Application Laid-Open No. 2005-61371, only the friction torque, which is a part of an external torque necessary for estimation of a gas pressure torque, is previously stored and used as a map on a rotational speed of an engine and a temperature of coolant water. Accordingly, the method of Japanese Patent Application Laid-Open No. 2005-61371 is limitedly applicable since a gas pressure torque can be measured only in a case where an external torque excluding a friction torque is obviously equal to zero or in a case where a load torque can be estimated with an additional measurement device such as an inclination sensor.

SUMMARY OF THE INVENTION

It is an object of the present invention to provide an angular velocity/angular acceleration calculator that calculates a crank angular velocity as well as a crank angular acceleration according to a crank angle sensor signal, a torque estimator that estimates a gas pressure torque as well as an external torque, and a combustion state estimator that estimates a combustion state.

According to the present invention, an exemplary angular velocity/angular acceleration calculator for a crank in an internal combustion engine includes a crank angle detection device, a crank angle correction device, and an angular velocity/angular acceleration calculation device. The crank angle detection device detects a crank angle in the internal combustion engine and a time at the crank angle. The crank angle correction device corrects, in accordance with a predetermined crank angle pitch, the crank angle and the time both detected by the crank angle detection device. The angular velocity/angular acceleration calculation device calculates an angular velocity and an angular acceleration of the crank by converting a function of the time with respect to the crank angle corrected by the crank angle correction device so as to be regarded as a periodic function, and utilizing the discrete Fourier transform of the converted function.

Accordingly, accurately calculated according to a crank angle sensor signal are an angular velocity and an angular acceleration of the crank.

According to the present invention, an exemplary torque estimator in an internal combustion engine includes the angular velocity/angular acceleration calculator described above, and an axial torque calculation device. The axial torque calculation device calculates an axial torque of the crank by applying the crank angle corrected by the crank angle correction device as well as the angular velocity and the angular acceleration of the crank calculated by the angular velocity/angular acceleration calculator to an equation of motion for a system including a piston, a connecting rod, and the crank in the internal combustion engine.

In the torque estimator described above, the angular velocity/angular acceleration calculator accurately calculates an angular velocity and an angular acceleration of the crank. Accordingly, accurately estimated are a gas pressure torque as well as an external torque.

According to the present invention, an exemplary combustion state estimator estimates a combustion state of an internal combustion engine in accordance with values including the angular acceleration calculated by the angular velocity/angular acceleration calculator described above or the gas pressure torque calculated by the torque estimator described above.

In the above combustion state estimator according to the present invention, the angular velocity/angular acceleration calculator accurately calculates an angular velocity and an angular acceleration of the crank, so as to accurately estimate the combustion state.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiment

Figure 1:
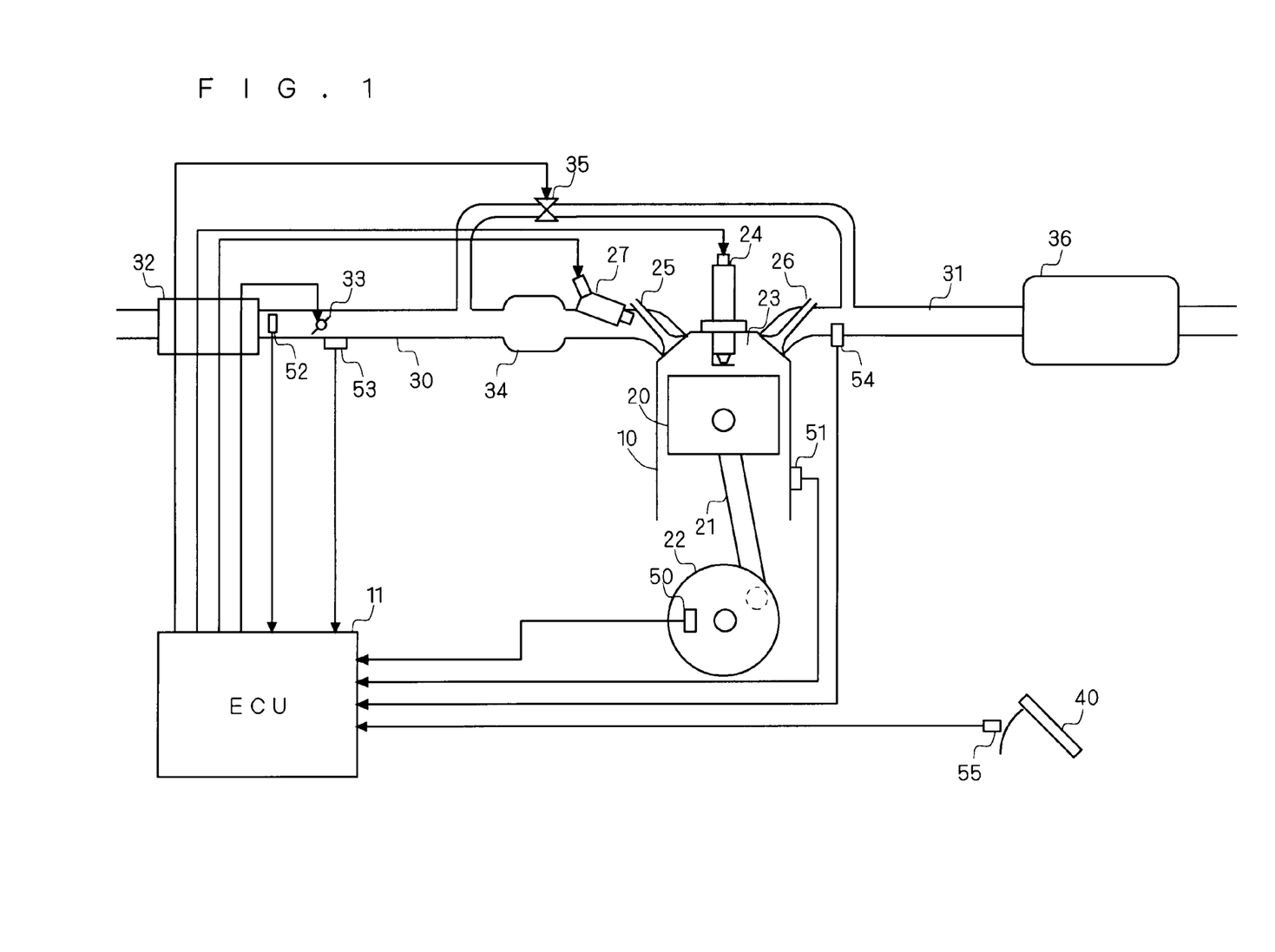
FIG. 1 is a schematic diagram of an internal combustion engine that includes a combustion state estimator according to an embodiment of the present invention.

FIG. 1 is a schematic diagram of an internal combustion engine that includes a combustion state estimator according to the present embodiment. The internal combustion engine shown in FIG. 1 exemplifies a four-stroke straight four-cylinder engine. FIG. 1 shows an engine 10 that has pistons 20 respectively provided in the cylinders, and combustion chambers 23 respectively disposed above the pistons 20.

The engine 10 is connected to an intake path 30 and an exhaust path 31. Intake air passes through an air filter 32 that is provided at an upstream end of the intake path 30, and enters a surge tank 34 via an airflow sensor 52 and a throttle valve 33. Disposed in the vicinity of the throttle valve 33 is a throttle sensor 53 that detects the amount of throttle opening. The air having entered the surge tank 34 is taken into the combustion chambers 23 of the respective cylinders via intake valves 25 that are provided at a downstream end of the intake path 30. Disposed on the downstream of the surge tank 34 is a fuel injection valve 27 that sprays fuel.

The air taken into each of the combustion chambers 23 and the fuel sprayed from the fuel injection valve 27 are ignited by a spark from a spark plug 24, and an exhaust gas is discharged from an exhaust valve 26. The exhaust gas passes through the exhaust path 31 and is discharged outside after being purified by an exhaust gas purification catalyst 36. The exhaust gas discharged from the combustion chambers 23 is partially taken into the intake path 30 via an exhaust gas recirculation (EGR) valve 35. Disposed on the exhaust path 31 is an air-fuel ratio sensor 54 that detects a concentration of oxygen in an exhaust gas.

The piston 20 in each of the cylinders is connected to a crankshaft 22 via a connecting rod 21 so that reciprocation of the piston 20 is converted to rotation. There is disposed in the crankshaft 22 a crank angle sensor 50 that detects an angle of rotation thereof. Each of the cylinders is provided with a water temperature sensor 51 that detects a temperature of coolant water.

The engine 10 further includes an engine control unit (ECU) 11 that receives signals transmitted from the airflow sensor 52, the throttle sensor 53, the air-fuel ratio sensor 54, the crank angle sensor 50, and the water temperature sensor 51, as well as from sensors such as an accelerator sensor 55 provided to an accelerator 40, and controls an intake air volume, a sprayed fuel amount, an ignition timing, and the like, according to an operation state. The ECU 11 includes a crank angle detection device, a crank angle correction device, an angular velocity/angular acceleration calculation device, an axial torque calculation device, an external torque estimation device, a gas pressure torque calculation device, a gas pressure work calculation device, and a combustion state estimation device, each of which is stored as a program to be executed.

Figure 2:
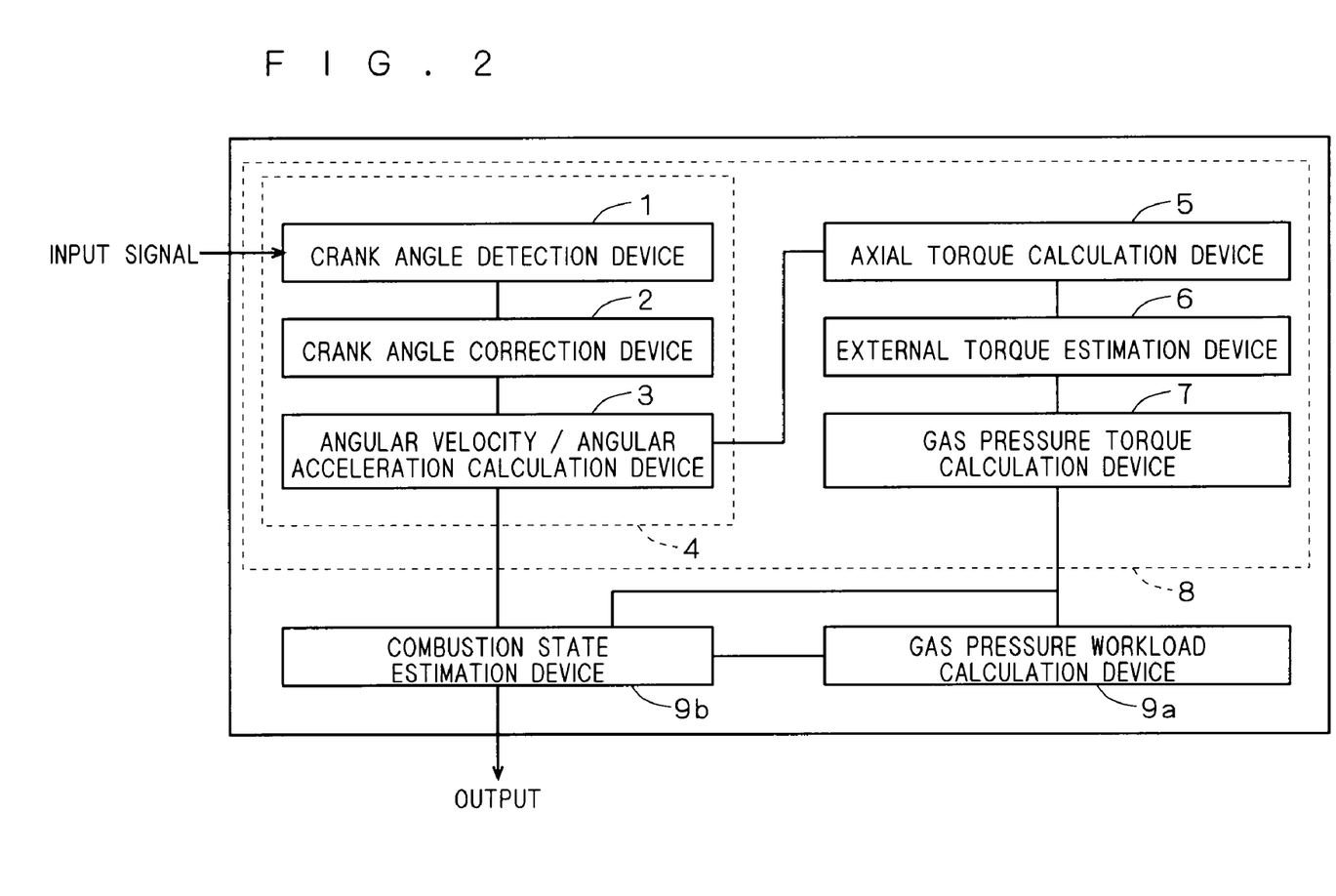
FIG. 2 is a block diagram of the combustion state estimator according to the embodiment of the present invention.

FIG. 2 is a diagram showing the combustion state estimator according to the present embodiment as a functional block.

The combustion state estimator shown in FIG. 2 includes a crank angle detection device 1, a crank angle correction device 2, and an angular velocity/angular acceleration calculation device 3. The crank angle detection device 1 detects a crank angle and a time corresponding thereto according to a signal received from the crank angle sensor 50. The crank angle correction device 2 corrects the crank angle and the time detected by the crank angle detection device 1. The angular velocity/angular acceleration calculation device 3 calculates a crank angular velocity and a crank angular acceleration according to a result of correction by the crank angle correction device 2. As shown in FIG. 2, there is configured an angular velocity/angular acceleration calculator 4 that includes the crank angle detection device 1, the crank angle correction device 2, and the angular velocity/angular acceleration calculation device 3.

The combustion state estimator shown in FIG. 2 further includes an axial torque calculation device 5, an external torque estimation device 6, and a gas pressure torque calculation device 7. The axial torque calculation device 5 calculates an axial torque according to a result of calculation by the angular velocity/angular acceleration calculation device 3 as well as an equation of motion regarding a system including the piston 20, the connecting rod 21, and the crankshaft 22. The external torque estimation device 6 estimates an external torque according to the axial torque at a peculiar crank angle. The gas pressure torque calculation device 7 calculates a gas pressure torque according to a result of calculation by the axial torque calculation device 5 and a result of estimation by the external torque estimation device 6. As shown in FIG. 2, there is configured a torque estimator 8 that includes the angular velocity/angular acceleration calculator 4, the axial torque calculation device 5, the external torque estimation device 6, and the gas pressure torque calculation device 7.

The combustion state estimator shown in FIG. 2 further includes a gas pressure work calculation device 9a and a combustion state estimation device 9b. The gas pressure work calculation device 9a calculates a gas pressure work according to a result of calculation by the gas pressure torque calculation device 7. The combustion state estimation device 9b estimates a combustion state of an internal combustion engine according to at least one of the results of calculation by the angular velocity/angular acceleration calculation device 3, the gas pressure torque calculation device 7, and the gas pressure work calculation device 9a, and outputs a result of estimation thereof.

Figure 3:
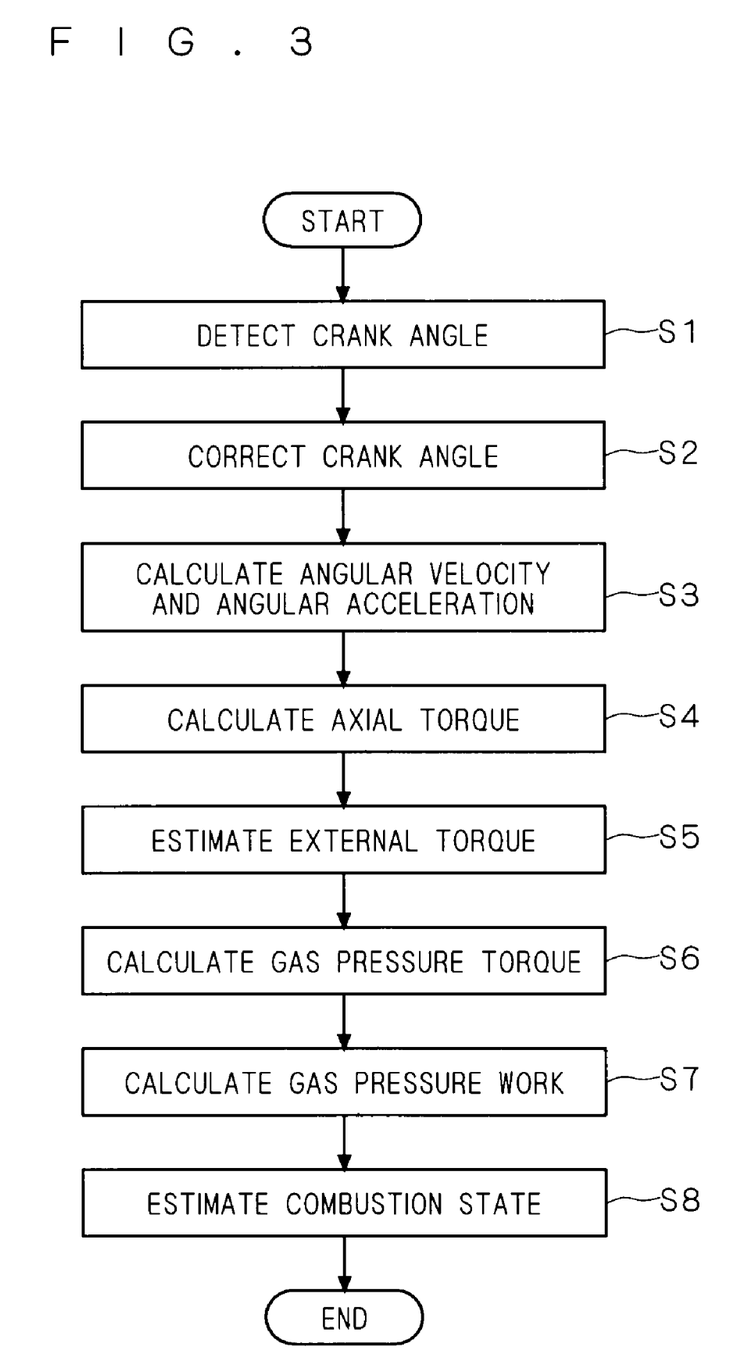
FIG. 3 is a flowchart showing behaviors of the combustion state estimator according to the embodiment of the present invention.

Specifically described below is how the combustion state estimator according to the present embodiment shown in FIGS. 1 and 2 calculates a crank angular velocity and a crank angular acceleration, estimates a torque outputted from an engine, and estimates a combustion state of the engine. FIG. 3 is a flowchart showing specific behaviors of the combustion state estimator according to the present embodiment.

In Step S1 shown in FIG. 3, the crank angle detection device 1 detects a time $t_n$ corresponding to a crank angle $\theta_n$ ($n=1, 2, \ldots, N_{sample}$) according to a signal transmitted from the crank angle sensor 50, where $N_{sample}$ denotes the number of samples and the crank angle $\theta_n$ indicates a cumulative angle. In a case where the crank angle sensor 50 detects a rotor with no missing tooth and no variation in size, a crank angle pitch $\theta_{n+1} - \theta_n$ has a constant value $\Delta\theta = 2\pi/N_{pulse}$ ($N_{pulse}$ denotes the number of teeth of the rotor, inclusive of any missing tooth (teeth)). However, since an actual rotor often has a missing tooth and a production variation, the crankshaft 22 is previously rotated by 360 degrees to evaluate and obtain the crank angle $\theta_n$ regarding the teeth excluding any missing tooth (teeth). Even in a case where a variation cannot be previously obtained, the crank angle $\theta_n$ regarding the teeth excluding any missing tooth (teeth) is to be calculated.

In Step S2 of FIG. 3, the crank angle correction device 2 calculates a time <hat>$t_j$ ($t_j$ having "^" on top thereof is expressed as <hat>$t_j$ in the text) at a crank angle <hat>$\theta_j$ ($\theta_j$ having "^" on top thereof is expressed as <hat>$\theta_j$ in the text) with the crank angle pitch $\Delta\theta$, according to the crank angle $\theta_n$ and the time $t_n$ corresponding thereto. The time <hat>$t_j$ can be calculated with use of the cubic spline interpolation method or the like, which is publicly known.

In Step S3 of FIG. 3, the angular velocity/angular acceleration calculation device 3 calculates a crank angular velocity and a crank angular acceleration of the crankshaft according to the crank angle <hat>$\theta_j$ in a predetermined crank angle range and the time <hat>$t_j$ corresponding thereto. In a case where the engine is of the four-stroke type and has cylinders of the number denoted by $N_{cylinder}$, the predetermined crank angle range is desirably equal to an integral multiple of $4\pi/N_{cylinder}$ (radian) in terms of periodicity of the engine process. It is assumed that there are samples of the number denoted by $N_{scope}$ in the predetermined crank angle range. For the sake of descriptive convenience, an index for the crank angle <hat>$\theta_j$ in the predetermined crank angle range and the time <hat>$t_j$ corresponding thereto is expressed as j=1, 2, ..., $N_{scope}$. It should be noted that a crank angle <hat>$\theta_j$ and a time <hat>$t_j$ corresponding thereto, where j=$N_{scope}$+1, are to be applicable in a subsequent calculation.

Specifically described below is how to calculate a crank angular velocity and a crank angular acceleration of a crankshaft. To begin with, in a case where crank angles are indicated on a horizontal axis and times are indicated on a vertical axis, there is considered a function t($\theta$) including a point at the crank angle <hat>$\theta_j$ and the time <hat>$t_j$ corresponding thereto, to define Equation 2 using $\alpha$ that is included in Equation 1. In terms of the periodicity of the engine process, Equation 2 can be regarded as a periodic function that has a cycle of the predetermined crank angle range.

$$\alpha = \frac{\hat{t}_{Nscope+1} - \hat{t}_1}{\hat{\theta}_{Nscope+1} - \hat{\theta}_1} \quad \text{[Equation 1]}$$

$$x(\theta) = t(\theta) - \alpha\theta \quad \text{[Equation 2]}$$

By differentiating Equation 2 with respect to $\theta$ and simplifying a result thereof, obtained is an angular velocity <dot>$\theta$ ($\theta$) ($\theta$ having "•" on top thereof is expressed as <dot>$\theta$ in the text), which is a function of the crank angle $\theta$.

$$\dot{\theta}(\theta) = \frac{d\theta}{dt}(\theta) = \frac{1}{\frac{dx(\theta)}{d\theta} + \alpha} \quad \text{[Equation 3]}$$

In actual calculation, dx(<hat>$\theta_j$)/d$\theta$ is obtained according to a sample point $x_j$ of x($\theta$), where $x_j$=<hat>$t_j$−$\alpha$<hat>$\theta_j$ (j=1, 2, ..., $N_{scope}$), so as to calculate <dot>$\theta$(<hat>$\theta_j$). When the discrete Fourier transformed of $x_j$ is indicated by X($\omega$) (|$\omega$|≤$\pi$/$\Delta\theta$), dx(<hat>$\theta_j$)/d$\theta$ is obtained by inverse discrete Fourier transform of i$\omega$X($\omega$), where i is a unit imaginary number.

An angular acceleration <2dot>$\theta$($\theta$) (($\theta$ having "••" on top thereof is expressed as <2dot>$\theta$ in the text) at the crank angle $\theta$ is obtained according to Equation 4. There is obtained $d^2$t(<hat>$\theta_j$)/$d\theta^2$ by inverse discrete Fourier transform of $(i\omega)^2 X(\omega)$.

$$\ddot{\theta}(\theta) = \frac{d^2\theta}{dt^2}(\theta) = -\dot{\theta}(\theta)3\frac{d^2 t(\theta)}{d\theta^2} \quad \text{[Equation 4]}$$

In calculation of the crank angular velocity and the crank angular acceleration according to Equations 3 and 4, it is possible to remove high frequency components of X($\omega$). Variations in detection or noise components can be reduced in the crank angle sensor 50 by removing frequency components having frequencies higher than a predetermined frequency (the high frequency components) of X($\omega$). The predetermined frequency indicates the lowest frequency included in frequency components that are not important for calculation of a crank angular velocity and a crank angular acceleration.

The above calculation method adopts the periodic function expressed by Equation 2 in order to obtain the crank angular velocity and the crank angular acceleration in the predetermined crank angle range. However, the present invention is not limited thereto but a window function can be adopted in calculation. More specifically, in calculation of a crank angular velocity and a crank angular acceleration, where j=1, 2, ..., $N_{scope}$, applied are <hat>$\theta_j$ and <hat>$t_j$, where j=−M+1, ..., $N_{scope}$+M (M is an appropriate natural number).

The crank angular velocity and the crank angular acceleration of j=1, 2, ..., $N_{scope}$ are calculated according to Equations 3 and 4 whose x($\theta$) are replaced with x'($\theta$) in Equation 5 after applying to x'($\theta$) a window function expressed by Equation 6. Equation 6 includes appropriate constant numbers a and d, such as a=10 and d=4. Adoption of a window function such as the one expressed by Equation 6 enables accurate calculation of a crank angular velocity and a crank angular acceleration, even in a case where the rotational speed of the engine is rapidly varied. It is noted that the method for calculating a crank angular velocity and a crank angular acceleration with use of a window function is not limited to the case expressed by Equations 5 and 6.

$$x'(\theta) = t(\theta) - \alpha(\theta - \hat{\theta}_1) - \hat{t}_1 \quad \text{[Equation 5]}$$

$$w_j = \begin{cases} \exp\left(-a\left|\frac{-j+1}{M}\right|^d\right) & \text{if } j \in \{-M+1, ..., 0\} \\ 1 & \text{if } j \in \{1, ..., N_{scope}\} \\ \exp\left(-a\left|\frac{j-N_{scope}}{M}\right|^d\right) & \text{if } j \in \{N_{scope}+1, ..., N_{scope}+M\} \end{cases} \quad \text{[Equation 6]}$$

Figure 4:
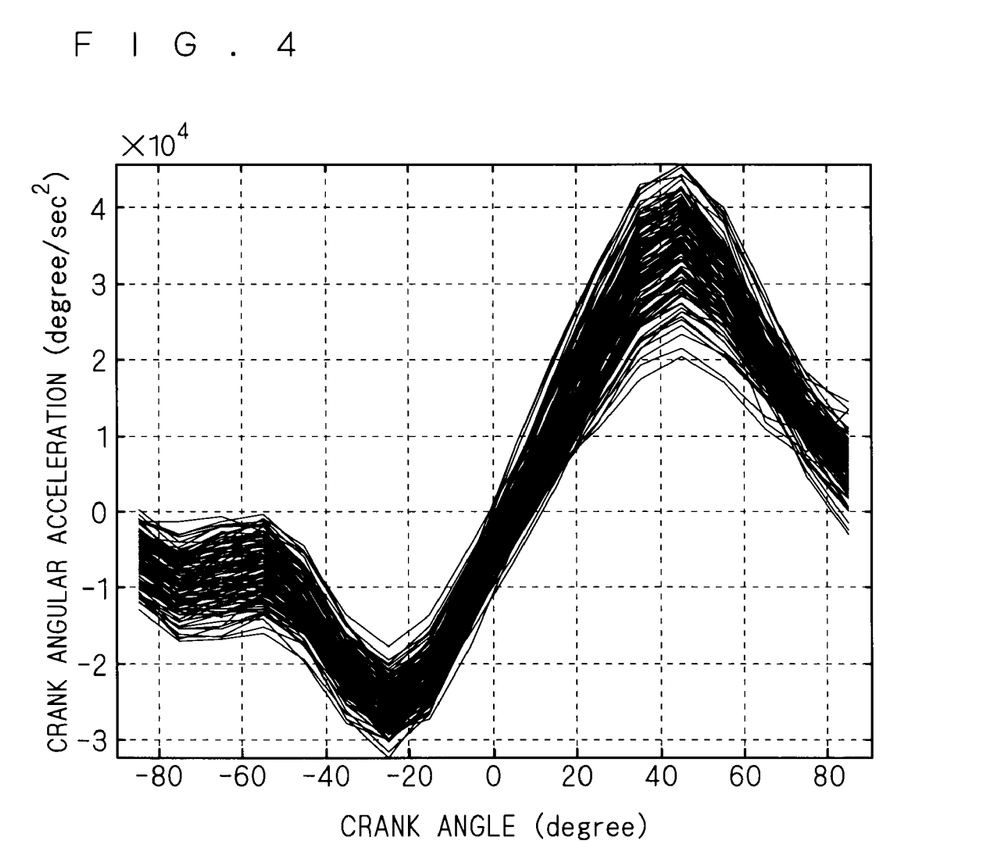
FIG. 4 is a graph showing crank angular accelerations that are calculated by the combustion state estimator according to the embodiment of the present invention.

FIG. 4 is a graph showing exemplary crank angular accelerations that are calculated by the angular velocity/angular acceleration calculation device 3. In FIG. 4, the crank angles are indicated on a horizontal axis and the crank angular accelerations are indicated on a vertical axis, in which superimposed are the crank angular accelerations for a plurality of ignition cycles. In accordance with FIG. 4, the crank angular acceleration has a peak value due to combustion at the crank angle of around 40 (degrees).

In Step S4 of FIG. 3, the axial torque calculation device 5 calculates an axial torque according to the equation of motion regarding the system including the piston 20, the connecting rod 21, and the crankshaft 22. Accordingly realized is highly accurate estimation of the axial torque around the crankshaft 22.

Figure 6:
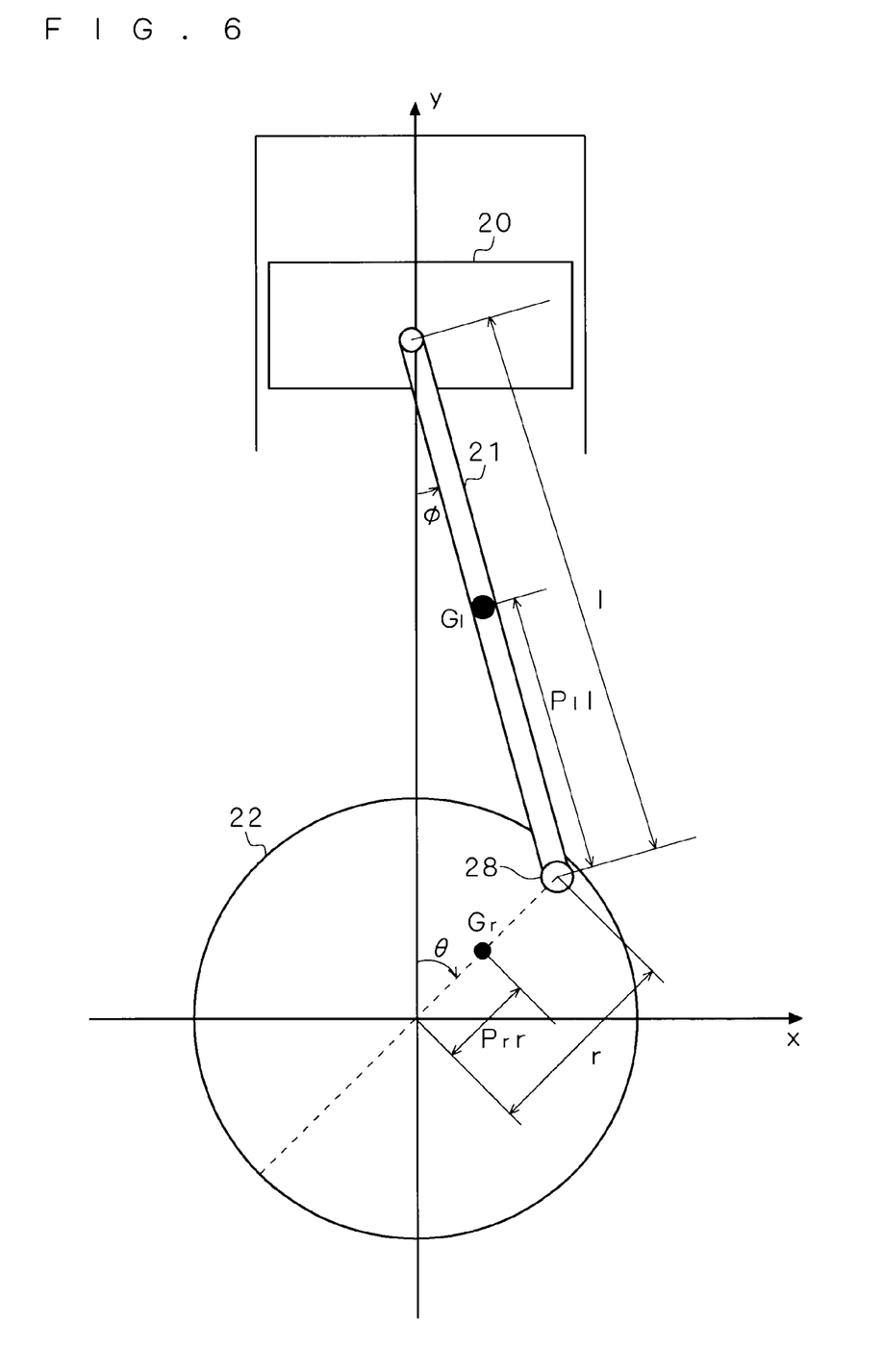
FIG. 6 is a diagram showing an engine model including a piston, a connecting rod and a crankshaft.

Specifically described below is an equation of motion that is used by the axial torque calculation device 5. In order to simplify the issue, considered is an equation of motion regarding one cylinder. FIG. 6 is a pattern diagram showing the piston 20, the connecting rod 21, and the crankshaft 22. It is assumed in FIG. 6 that the crankshaft 22 is horizontally disposed and the piston 20 has a top dead center positioned on a vertical line of the crankshaft 22. In FIG. 6, the x axis indicates a direction orthogonal to the crankshaft 22 in a horizontal plane, and the y axis indicates the vertical direction. Moreover, FIG. 6 shows a crank angle θ and an inclined angle φ of the connecting rod 21.

The piston 20 has a mass $m_p$. The connecting rod 21 has a length $l$, a mass $m_l$, a moment of inertia $I_l$, a center of gravity $G_l$, and a length $\rho_l l$ from the center of gravity $G_l$ to a crankpin 28. The crankshaft 22 has a crank radius $r$, a mass $m_r$, a moment of inertia $I_r$, a center of gravity $G_r$, and a length $\rho_r r$ from the center of the crankshaft 22 to the center of gravity $G_r$, where $\lambda = l/r$ and an acceleration of gravity is denoted by $g$.

Calculated are a kinetic energy K and a potential energy U of the entire system including the piston 20, the connecting rod 21, and the crankshaft 22 shown in FIG. 6. The equation of motion regarding this system is obtained by calculating the Lagrange's equation expressed by Equation 7, according to the Lagrangian $L = K - U$. In Equation 7, a gas pressure torque is denoted by Q and an external torque such as a friction torque is denoted by F.

$$\frac{d}{dt}\left(\frac{\partial L}{\partial \dot{\theta}}\right) - \frac{\partial L}{\partial \theta} = Q + F \quad [\text{Equation 7}]$$

When the entire system is assumed to have a moment of inertia I(θ) around the crankshaft 22 and a gravitational potential energy $U_g(\theta)$, the kinetic energy K, the potential energy U, and the equation of motion for the entire system are expressed by Equations 8, 9, and 10, respectively.

$$K = \frac{1}{2}I(\theta)\dot{\theta}^2 \quad [\text{Equation 8}]$$

$$U = U_g(\theta) \quad [\text{Equation 9}]$$

$$I(\theta)\ddot{\theta} + \frac{1}{2}I'(\theta)\dot{\theta}^2 + G(\theta) = Q + F \quad [\text{Equation 10}]$$

In Equation 10, $G(\theta) = \partial U_g(\theta)/\partial \theta$, as well as $I'(\theta) = dI(\theta)/d\theta$.

The equation of motion expressed by Equation 10 includes I(θ), I'(θ), and G(θ), which are simplified as expressed by Equations 11, 12, and 13, respectively.

$$I(\theta) = I_r + m_r(\rho_r r)^2 + I_l\left(\frac{\cos\theta}{\lambda\cos\phi}\right)^2 + m_l r^2(1-\rho_l)^2\cos^2\theta + \\ m_p r^2(\sin\theta + \tan\phi\cos\theta)^2 + m_l r^2(\sin\theta + \rho_l\tan\phi\cos\theta)^2 \quad [\text{Equation 11}]$$

$$I'(\theta) = \\ 2I_l\left(\frac{\cos^2\theta}{\lambda^2\cos^2\phi} - 1\right)\frac{\sin\theta\cos\theta}{\lambda^2\cos^2\phi} - 2m_l r^2(1-\rho_l)^2\sin\theta\cos\theta + \\ 2m_p r^2(\sin\theta + \tan\phi\cos\theta)\left(\cos\theta - \tan\phi\sin\theta + \frac{\cos^2\theta}{\lambda\cos^3\phi}\right) + \\ 2m_l r^2(\sin\theta + \rho_l\tan\phi\cos\theta)\left(\cos\theta - \rho_l\tan\phi\sin\theta + \rho_l\frac{\cos^2\theta}{\lambda\cos^3\phi}\right) \quad [\text{Equation 12}]$$

$$G(\theta) = -gr\{(m_p + m_l + \rho_r m_r)\sin\theta + (m_p\rho_l m_l)\tan\phi\cos\theta\} \quad [\text{Equation 13}]$$

In these equations, $\phi + \sin^{-1}((1/\lambda)\sin\theta)$.

The gas pressure torque Q is expressed by Equation 14.

$$Q = q(t)r(\sin\theta + \tan\phi\cos\theta) \quad [\text{Equation 14}]$$

In Equation 14, denoted by q(t) is a gas pressure force that presses the piston 20.

The four-stroke straight four-cylinder engine provided with the crankshaft 22 that is a rigid body has the functions I(θ), I'(θ), G(θ), and Q(θ), which are derived as Equations 15 to 18 from Equations 11 to 14, respectively.

$$I(\theta) = I_w + 4I_r + 4I_l\left(\frac{\cos\theta}{\lambda\cos\phi}\right)^2 + 4m_r(\rho_r r)^2 + \\ 4m_l r^2(1-\rho_l)^2\cos^2\theta + 4m_p r^2(\sin^2\theta + \tan^2\phi\cos^2\theta) + \\ 4m_l r^2(\sin^2\theta + \rho_l^2\tan^2\phi\cos^2\theta) \quad [\text{Equation 15}]$$

$$I'(\theta) = \\ 4r^2\left\{\frac{I_l}{r^2\cos^2\phi}\left(\frac{\cos^2\theta}{\lambda^2\cos^2\phi} - 1\right) + m_p\left(\frac{\cos^2\theta}{\lambda^2\cos^4\phi} - \tan^2\phi + 1\right) + \\ m_l\rho_l^2\left(\frac{\cos^2\theta}{\lambda^2\cos^4\phi} - \tan^2\phi + \frac{2}{\rho_l} - 1\right)\right\}\sin 2\theta \quad [\text{Equation 16}]$$

$$G(\theta) = -4gr(m_p + \rho_l m_l)\tan\phi\cos\theta \quad [\text{Equation 17}]$$

$$Q(\theta) = r(q_1(t) + q_4(t))(\sin\theta + \tan\phi\cos\theta) + \\ r(q_2(t)q_3(t))(-\sin\theta + \tan\phi\cos\theta) \quad [\text{Equation 18}]$$

In these equations, the crankshaft 22 has a flywheel connected thereto, and the flywheel has a moment of inertia $I_w$. The piston 20 in the k-th cylinder is pressed by a gas pressure force $q_k(t)$.

The equation of motion described above is merely an example, and the equation of motion adopted by the axial torque calculation device 5 is not limited thereto. Alternatively, it is possible to apply an equation of motion approximated in accordance with the two-mass model in which the connecting rod 21 shown in FIG. 6 has a mass only on two points of a crank end (a big end) and a piston end (a small end). When the equation of motion is approximated in accordance with the two-mass model, Equations 15 to 17 can be simplified to Equations 19 to 21, respectively.

$$I(\theta) = \{I_w + 4I_r + 4m_r(\rho_r r)^2 + 4m_{l1}r^2\} + \\ 4r^2(m_p + m_{l2})(\sin^2\theta + \tan^2\phi\cos^2\theta) \quad [\text{Equation 19}]$$

$$I'(\theta) = 4r^2(m_p + m_{l2})\left(\frac{\cos\theta}{\lambda^2\cos^4\phi} - \tan^2\phi + 1\right)\sin 2\theta \quad [\text{Equation 20}]$$

$$G(\theta) = -4gr(m_p + m_{l2})\tan\phi\cos\theta \quad [\text{Equation 21}]$$

In these equations, the mass at the crank end (the big end) is denoted by $m_{l1}$, and the mass at the piston end (the small end) is denoted by $m_{l2}$.

The axial torque calculation device 5 calculates an axial torque $T_r(\theta, \text{<dot>}\theta, \text{<2dot>}\theta)$ defined as the left-hand side of Equation 10, which is a function of a crank angle, a crank angular velocity and a crank angular acceleration, according to the crank angular velocity and crank the angular acceleration calculated by the angular velocity/angular acceleration calculation device 3.

In Step S5 of FIG. 3, the external torque estimation device 6 estimates an external torque according to the axial torque at the peculiar crank angle. Accordingly realized is accurate estimation of the external torque such as the friction torque or a road load.

Specifically described below is how to estimate an external torque. The external torque estimation device 6 utilizes the fact that, at a crank angle θ=0, π, which are located at upper and lower dead centers of the piston, Equations 16 to 18 are each equal to zero, and that the equation of motion expressed by Equation 10 becomes that of Equation 22.

$$I(\theta)\ddot{\theta}=F \qquad \text{[Equation 22]}$$

The external torque estimation device 6 then estimates an external torque F by applying to Equation 22 the crank angular acceleration that is calculated by the angular velocity/angular acceleration calculation device 3. The external torque F may be estimated, with an assumption that the external torque F has a constant value, by averaging external torques calculated according to the crank angular accelerations at the upper and lower dead centers of the plurality of pistons 20, or by applying the publicly known Kalman filter or the like to external torques calculated according to the crank angular accelerations at the upper and lower dead centers of the pistons 20. Further alternatively, the external torque F may be estimated by calculating an external torque according to the crank angular acceleration at the upper dead center of the piston 20 in a specific cylinder.

The external torque estimation device 6 is not directed only to a four-stroke four-cylinder engine, but can be applied to another type of engine. More specifically, an engine provided with an arbitrary number of cylinders is assumed to have a function of Lagrangian $L(\theta, \dot{\theta})$ with respect to a crank angle θ and a crank angular velocity $\dot{\theta}$. In a case where, with respect to a small amount of change ∂θ at a certain crank angle θ*, the Lagrangian $L(\theta, \dot{\theta})$ has symmetry $L(\theta^*+\partial\theta, \dot{\theta})=L(\theta^*-\partial\theta, \dot{\theta})$, a moment of inertia I(θ) around the crankshaft 22 and a gravitational potential energy $U_g(\theta)$ have symmetry $I(\theta^*+\partial\theta)=I(\theta^*-\partial\theta)$, symmetry $U_g(\theta^*+\partial\theta)=U_g(\theta^*-\partial\theta)$, respectively. Such symmetry is evidently satisfied in a case where a mechanism of a target system (in the above example, the system including the piston 20, the connecting rod 21, and the crankshaft 22) is symmetric with respect to transformation from (θ*+∂θ) to (θ*−∂θ). When conditions for the symmetry are satisfied at the crank angle θ*, the derivatives of the moment of inertia I(θ) around the crankshaft 22 and the gravitational potential energy $U_g(\theta)$ with respect to θ, I'(θ) and G(θ) are equal to zero, respectively, at the crank angle θ*.

A four-stroke single-cylinder engine has a crank angle θ*=0, π (the upper and lower dead centers of the piston 20). Moreover, the upper and lower dead centers of the piston 20 each have a gas pressure torque Q equal to zero. Accordingly, the equation of motion at the upper and lower dead centers is expressed by Equation 22.

The above details with respect to the four-stroke single-cylinder engine are also true with respect to the four-stroke straight four-cylinder engine. Such a crank angle θ* is referred to as the peculiar crank angle, at which equation of motion is expressed as a relational equation among the moment of inertia I(θ), the crank angular acceleration $\ddot{\theta}$, and the external torque F. The external torque estimation device 6 estimates the external torque F by applying Equation 22 at this peculiar crank angle θ*.

The external torque F can be estimated even in a case where Equation 22 is not strictly but approximately consistent. In a case of a four-stroke straight six-cylinder engine, Equation 22 is approximately consistent since, at the upper dead center of each of the pistons 20, a crank angle θ=0, ±2π/3, accordingly, I'(θ)=0, G(θ)=0, and a gas pressure torque Q has an adequately small value. Any crank angle at which Equation 22 is approximately consistent is regarded as the peculiar crank angle by the external torque estimation device 6.

In Step S6 of FIG. 3, the gas pressure torque calculation device 7 calculates a gas pressure torque $\hat{Q}$ according to the axial torque $T_r(\theta, \dot{\theta}, \ddot{\theta})$ obtained by the axial torque calculation device 5 and an external torque $\hat{F}$ estimated by the external torque estimation device 6. More specifically, the gas pressure torque $\hat{Q}$ is obtained by subtracting the estimated external torque $\hat{F}$ from the axial torque $T_r(\theta, \dot{\theta}, \ddot{\theta})$.

Figure 5:
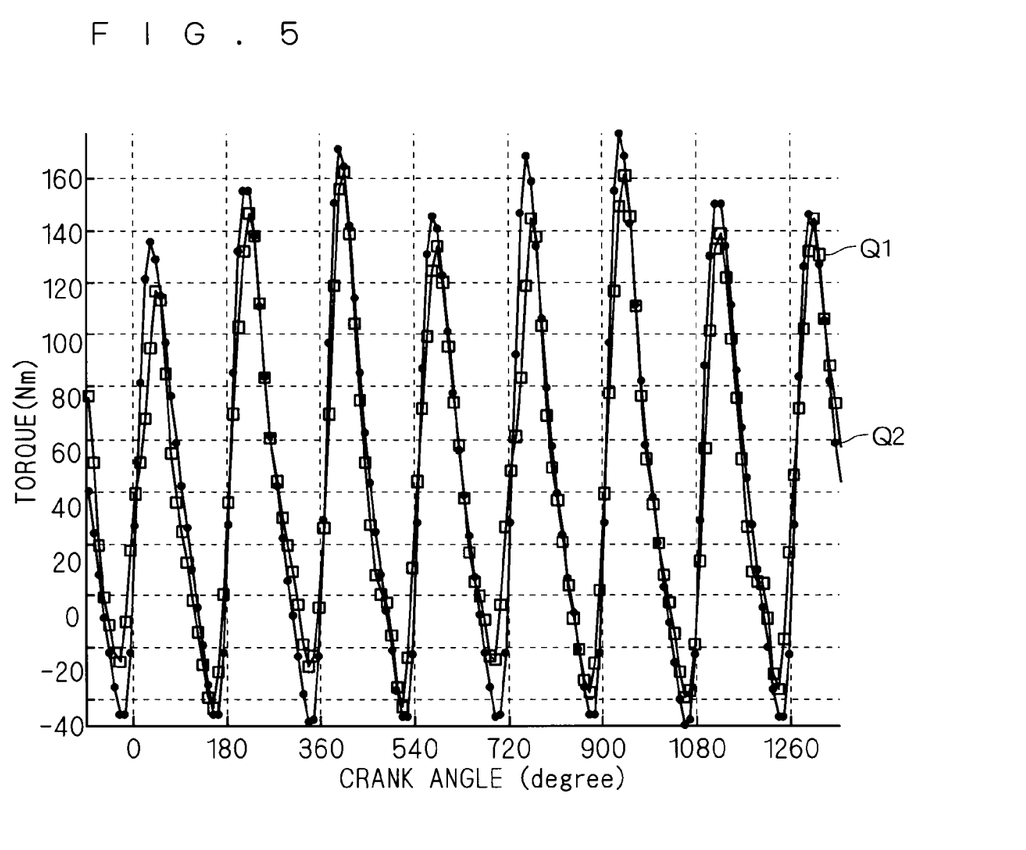
FIG. 5 is a graph showing gas pressure torques that are estimated by the torque estimator according to the embodiment of the present invention.

FIG. 5 is a graph showing exemplary gas pressure torques that are calculated by the gas pressure torque calculation device 7. In FIG. 5, the crank angles are indicated on a horizontal axis and torques are indicated on a vertical axis, respectively. There are shown in FIG. 5 values of a gas pressure torque Q1 calculated by the gas pressure torque calculation device 7, as well as, for the purpose of comparison, values of a gas pressure torque Q2 calculated according to the internal pressures of the cylinder, which are measured together with the crank angles. As apparent from FIG. 5, the gas pressure torque Q1 calculated by the gas pressure torque calculation device 7 is accurately consistent with the gas pressure torque Q2 calculated according to the internal pressure of the cylinder.

In Step S7 of FIG. 3, the gas pressure work calculation device 9a calculates a gas pressure work $W_Q$ by integrating the gas pressure torque $\hat{Q}$ that is calculated by the gas pressure torque calculation device 7 with respect to the crank angle θ in the predetermined crank angle range. Accordingly, accurately calculated is the gas pressure work $W_Q$ that reflects the combustion state in the predetermined crank angle range.

In Step S8 of FIG. 3, the combustion state estimation device 9b estimates the combustion state of the internal combustion engine according to at least one of the values of the crank angular acceleration $\ddot{\theta}$ calculated by the angular velocity/angular acceleration calculation device 3, the gas pressure torque $\hat{Q}$ calculated by the gas pressure torque calculation device 7, and the gas pressure work $W_Q$ calculated by the gas pressure work calculation device 9a.

More specifically, the combustion state estimation device 9b is capable of estimating whether or not the gas pressure work $W_Q$ generates a required work by combustion in the internal combustion engine and whether or not miscombustion occurs. The combustion state estimation device 9b is also capable of estimating combustion variations among the cylinders by comparing the gas pressure works $W_Q$ of the cylinders with one another. Furthermore, the combustion state estimation device 9b is capable of estimating a degree of variation in combustion in the internal combustion engine by calculating a COV value (a value obtained by dividing a standard deviation of the gas pressure work $W_Q$ by an average thereof) of the gas pressure work $W_Q$.

The combustion state estimation device 9b calculates a gas pressure peak position and a magnitude thereof according to the gas pressure torque $\hat{Q}$, so as to estimate whether or not the ignition timing is appropriate, whether or not miscombustion occurs, and whether or not abnormal combustion (such as knocking or preignition) is caused. Alternatively, the combustion state estimation device 9b calculates a variation amount of the gas pressure torque $\hat{Q}$ so as to estimate abnormal combustion.

Estimation of the combustion state by the combustion state estimation device 9b can be simplified in a case where the crank angular acceleration $\ddot{\theta}$ is applied in place of the gas pressure torque $\hat{Q}$.

As described above, the combustion state estimation device 9b is capable of grasping the state of the internal combustion engine according to at least one of the values of the crank angular acceleration $\ddot{\theta}$, the gas pressure torque $\hat{Q}$, and the gas pressure work $W_Q$, or a value obtained by combining some of these values.

The combustion state estimator according to the present embodiment includes the angular velocity/angular acceleration calculator 4 that is provided with the crank angle detection device 1, the crank angle correction device 2, and the angular velocity/angular acceleration calculation device 3, so as to realize highly accurate calculation of a crank angular velocity and a crank angular acceleration. It is noted that the combustion state estimator according to the present embodiment accurately calculates a crank angular velocity and a crank angular acceleration, not with a cylinder internal pressure sensor but with a crank angle sensor. The combustion state estimator according to the present embodiment is therefore highly durable as well as operable for a longer period of time.

The combustion state estimator according to the present embodiment further includes the torque estimator 8 that is provided with the angular velocity/angular acceleration calculator 4, the axial torque calculation device 5, the external torque estimation device 6, and the gas pressure torque calculation device 7, so as to realize highly accurate estimation of an axial torque $T_r(\theta, \dot{\theta}, \ddot{\theta})$, an external torque F, and a gas pressure torque Q. Furthermore, the combustion state estimator according to the present embodiment includes the torque estimator 8, the gas pressure work calculation device 9a, and the combustion state estimation device 9b, so as to realize accurate grasp of a state of an internal combustion engine, as well as energy conservation and reduction in discharge of exhaust gas in the internal combustion engine.

While the invention has been shown and described in detail, the foregoing description is in all aspects illustrative and not restrictive. It is therefore understood that numerous modifications and variations can be devised without departing from the scope of the invention.

What is claimed is:

1. An angular velocity/angular acceleration calculator for a crankshaft in an internal combustion engine, the calculator comprising:
    a crank angle detection device that detects a crank angle in said internal combustion engine and a time at said crank angle;
    a crank angle correction device that corrects, in accordance with a predetermined crank angle pitch, said crank angle and said time both detected by said crank angle detection device; and
    an angular velocity/angular acceleration calculation device that calculates an angular velocity and an angular acceleration of said crankshaft by converting a function of said time with respect to said crank angle corrected by said crank angle correction device so as to be regarded as a periodic function, and utilizing a derivative of said converted function with respect to said crank angle obtained from a discrete Fourier transform of said converted function.

2. The angular velocity/angular acceleration calculator according to claim 1, wherein
    said angular velocity/angular acceleration calculation device converts said function so as to be regarded as a periodic function with application of a window function.

3. The angular velocity/angular acceleration calculator according to claim 1, wherein
    said angular velocity/angular acceleration calculation device removes frequency components of said discrete Fourier transform that have a frequency higher than a predetermined frequency.

4. A torque estimator in an internal combustion engine, the estimator comprising:
    an angular velocity/angular acceleration calculator for a crankshaft in the internal combustion engine, the calculator including,
        a crank angle detection device that detects a crank angle in said internal combustion engine and a time at said crank angle,
        a crank angle correction device that corrects, in accordance with a predetermined crank angle pitch, said crank angle and said time both detected by said crank angle detection device, and
        an angular velocity/angular acceleration calculation device that calculates an angular velocity and an angular acceleration of said crankshaft by converting a function of said time with respect to said crank angle corrected by said crank angle correction device so as to be regarded as a periodic function, and utilizing a derivative of said converted function with respect to said crank angle obtained from a discrete Fourier transform of said converted function; and
    an axial torque calculation device that calculates an axial torque of said crankshaft by applying said crank angle corrected by said crank angle correction device and said angular velocity and said angular acceleration of said crankshaft calculated by said angular velocity/angular acceleration calculator to an equation of motion for a system including a piston, a connecting rod, and said crank in said internal combustion engine.

5. The torque estimator according to claim 4, wherein
    said axial torque calculation device uses said equation of motion in which said connecting rod has a mass thereof on said piston end and on said crank end based on a two-mass model.

6. The torque estimator according to claim 4, further comprising:
    an external torque estimation device that estimates an external torque according to the torque obtained in accordance with said equation of motion at a peculiar crank angle allowing said equation of motion to be regarded as a relational equation among a moment of inertia, an angular acceleration, and the external torque around the crankshaft.

7. The torque estimator according to claim 6, further comprising:
    a gas pressure torque calculation device that calculates a gas pressure torque by subtracting said external torque estimated by said external torque estimation device from said axial torque calculated by said axial torque calculation device.

8. The torque estimator according to claim 7, further comprising:
    a gas pressure work calculation device that calculates a gas pressure work by integrating said gas pressure torque calculated by said gas pressure torque calculation device in a predetermined range of said crank angle.

9. A combustion state estimator that estimates a combustion state of an internal combustion engine, the internal combustion engine including a crankshaft, said estimator comprising:
    an estimator unit that estimates the combustion state of the internal combustion engine in accordance with at least one of an angular acceleration calculated by an angular velocity/angular acceleration calculator, a gas pressure torque calculated by a gas pressure torque calculation device, and a gas pressure work calculated by a gas pressure work calculation device, wherein said angular velocity/angular acceleration calculator includes,
- a crank angle detection device that detects a crank angle in said internal combustion engine and a time at said crank angle,
- a crank angle correction device that corrects, in accordance with a predetermined crank angle pitch, said crank angle and said time both detected by said crank angle detection device, and
- an angular velocity/angular acceleration calculation device that calculates an angular velocity and the angular acceleration of said crankshaft by converting a function of said time with respect to said crank angle corrected by said crank angle correction device so as to be regarded as a periodic function, and utilizing a derivative of said converted function with respect to said crank angle obtained from a discrete Fourier transform of said converted function, said gas pressure torque calculation device includes,
- said angular velocity/angular acceleration calculator,
- an axial torque calculation device that calculates an axial torque of said crankshaft by applying said crank angle corrected by said crank angle correction device and said angular velocity and said angular acceleration of said crankshaft calculated by said angular velocity/angular acceleration calculator to an equation of motion for a system including a piston, a connecting rod, and said crank in said internal combustion engine,
- an external torque estimation device that estimates an external torque according to the torque obtained in accordance with said equation of motion at a peculiar crank angle allowing said equation of motion to be regarded as a relational equation among a moment of inertia, an angular acceleration, and the external torque around the crankshaft, and
- a gas pressure torque calculation device that calculates the gas pressure torque by subtracting said external torque estimated by said external torque estimation device from said axial torque calculated by said axial torque calculation device, and said gas pressure work calculation device includes,
- said gas pressure torque calculation device, and
- a gas pressure work calculation device that calculates the gas pressure work by integrating said gas pressure torque calculated by said gas pressure torque calculation device in a predetermined range of said crank angle.

* * * * *